(12) United States Patent
Conway et al.

(10) Patent No.: US 6,315,297 B1
(45) Date of Patent: Nov. 13, 2001

(54) SEAL

(75) Inventors: Paul Francis Conway, Fig Tree Pocket; Bradley John Ryan, Centennial Park; Kenneth Michael Crane, Yamanto, all of (AU)

(73) Assignee: Sealing Technology Pty Ltd., Queensland (AU)

( * ) Notice: Subject to any disclaimer, the term of this patent is extended or adjusted under 35 U.S.C. 154(b) by 0 days.

(21) Appl. No.: 09/421,533

(22) Filed: Oct. 20, 1999

(30) Foreign Application Priority Data

Oct. 21, 1998 (AU) .................................................. PP6605

(51) Int. Cl.[7] .................................................. F16J 15/34
(52) U.S. Cl. .................................................. 277/362
(58) Field of Search .................................. 277/358, 362, 277/365, 367, 366

(56) References Cited

U.S. PATENT DOCUMENTS

| | | | |
|---|---|---|---|
| 3,547,452 | * 12/1970 | Hirata | 277/367 X |
| 3,591,188 | * 7/1971 | Eisner | 277/366 |
| 4,294,454 | * 10/1981 | Cannings | 277/366 |
| 4,721,311 | * 1/1988 | Kakabaker | 277/369 |
| 5,409,241 | * 4/1995 | Bowers | 277/366 |

* cited by examiner

Primary Examiner—Robert J. Sandy
Assistant Examiner—Karlena D. Schwing
(74) Attorney, Agent, or Firm—Burns, Doane, Swecker & Mathis, L.L.P.

(57) ABSTRACT

A seal assembly (10) for a pump provides sealing between a rotating shaft assembly (11, 12) and a fixed casing (13). The casing (13) has inner and outer stationary sealing faces (33, 34). A spacer (21) is rotationally locked to the sleeve (12), but the sleeve (12) is able to move axially relative to the spacer (21), at least to a limited extent. Inner and outer rotating heads (26, 27) are carried by spacer (21) and are biased by axial springs (32) against respective stationary sealing faces (33, 34). The seal assembly provides a double seal between rotating and stationary members, yet accommodates axial movement of the shaft sleeve (12). The sealing components are located in a chamber (14) containing liquid lubricant, and a paddle (25) is provided on the spacer (21) to induce circulation and misting of the lubricant.

13 Claims, 5 Drawing Sheets

SEAL

THIS INVENTION relates to an improved seal. The invention is particularly, but not solely, directed to a mechanical seal for a slurry pump.

BACKGROUND ART

Slurry pumps are used in mining and other industrial applications to pump slurries and similar mixtures. A slurry pump typically comprises an impeller located within a pump housing, the impeller being mounted on a shaft extending into the housing. The shaft is normally driven by an electric motor outside the housing.

Due to the corrosive, toxic or otherwise aggressive nature of slurries, a reliable seal must be provided between the shaft and the housing of the slurry pump. This seal must be able to withstand the corrosive or aggressive nature of the slurry, as well as the high operating pressures and speed. Failure of seals leads to significant downtime while the seals are replaced. Since the slurry pumps often operate in remote locations, the sourcing and replacement of a seal may take a substantial period of time.

Known slurry pump seals have traditionally been based on conventional seal design. Such seals have a number of inherent disadvantages particularly when used in slurry pumps. For example, conventional seals are often unable to accommodate the relatively large amount of axial movement of the shaft which results from adjustment of the rotating part of the pump. Hence, it is necessary to physically undo the clamping rings or grub screws, move the rotating part of the pump, and then physically reset the clamping rings or grub screws whenever the impeller is adjusted. Due to the viscous nature of slurries, they tend to coagulate or clog in any small gap in their path. Hence, even if the seal drive clamp rings or grub screws are released, it is still difficult to move the rotating part of the pump through the seal due to the clogging caused by the slurry after even a relatively small amount of use.

Furthermore, known seals for slurry pumps generally cannot run dry, unless they have a water flush or some form of barrier fluid system from an outside source. In many applications, such as mining installations, sources of clean water are rarely available or are prohibitively expensive. Without a water flush or some other form of barrier fluid system, known seals often fail due to overheating and/or buildup of slurry as the seal is exposed to the slurry itself.

Where a water flush is available, the introduction of additional water to the pumped product may alter the desired characteristics of the product and/or require further processing in order to remove the added water.

Other known sealing arrangements involve complex installation of the seals such that the pump sleeve often has to be replaced. This often leads to incorrect fitting and premature failure.

Known sealing devices also fail regularly as a result of their inability to maintain the seal at higher pressures or during pressure spikes which occur when the slurry pump is part of a larger system which may involve other pumps.

It is an object of the present invention to provide an improved seal, particularly for slurry pumps, which overcomes or ameliorates the abovedescribed disadvantages, or which at least provides a useful alternative.

SUMMARY OF THE INVENTION

In one broad form, the invention provides a seal including
- a housing having at least one stationary sealing surface,
- a shaft assembly rotatable in the housing,
- a sealing assembly mounted on the shaft assembly and rotatable therewith, the sealing assembly having at least one moveable sealing surface operatively abutting the stationary sealing surface,
- wherein the shaft assembly is moveable axially relative to the sealing assembly.

In the preferred embodiment, the housing has two axially-spaced fixed radial sealing surfaces, and the sealing assembly has two moveable radial sealing surfaces, each operatively biased against a respective one of the stationary sealing surfaces. The sealing assembly also includes a spacer located between the two moveable sealing surfaces which are biased away from the spacer.

The spacer is preferably locked rotationally to the shaft assembly by a keylock, which still permits relative axial movement between the spacer and the shaft assembly. In this manner, the sealing assembly can maintain both dynamic seals even where there is relative movement between the shaft assembly and the sealing assembly.

The shaft assembly typically comprises a shaft having a sleeve fixed rotationally to the shaft.

The housing suitably provides a chamber around the sealing assembly which contains a lubricant. A paddle member may be provided on the spacer to promote circulation and misting of the lubricant within the chamber.

A pressure reducing plate may be fitted to the pump end of the seal to reduce the effect of pressure and/or pressure spikes on the inner dynamic seal.

The seal is particularly suitable for use in slurry pumps.

In order that the invention may be more fully understood and put into practice, a preferred embodiment thereof will now be described with reference to the accompanying drawings.

DESCRIPTION OF PREFERRED EMBODIMENT

Figure 1:
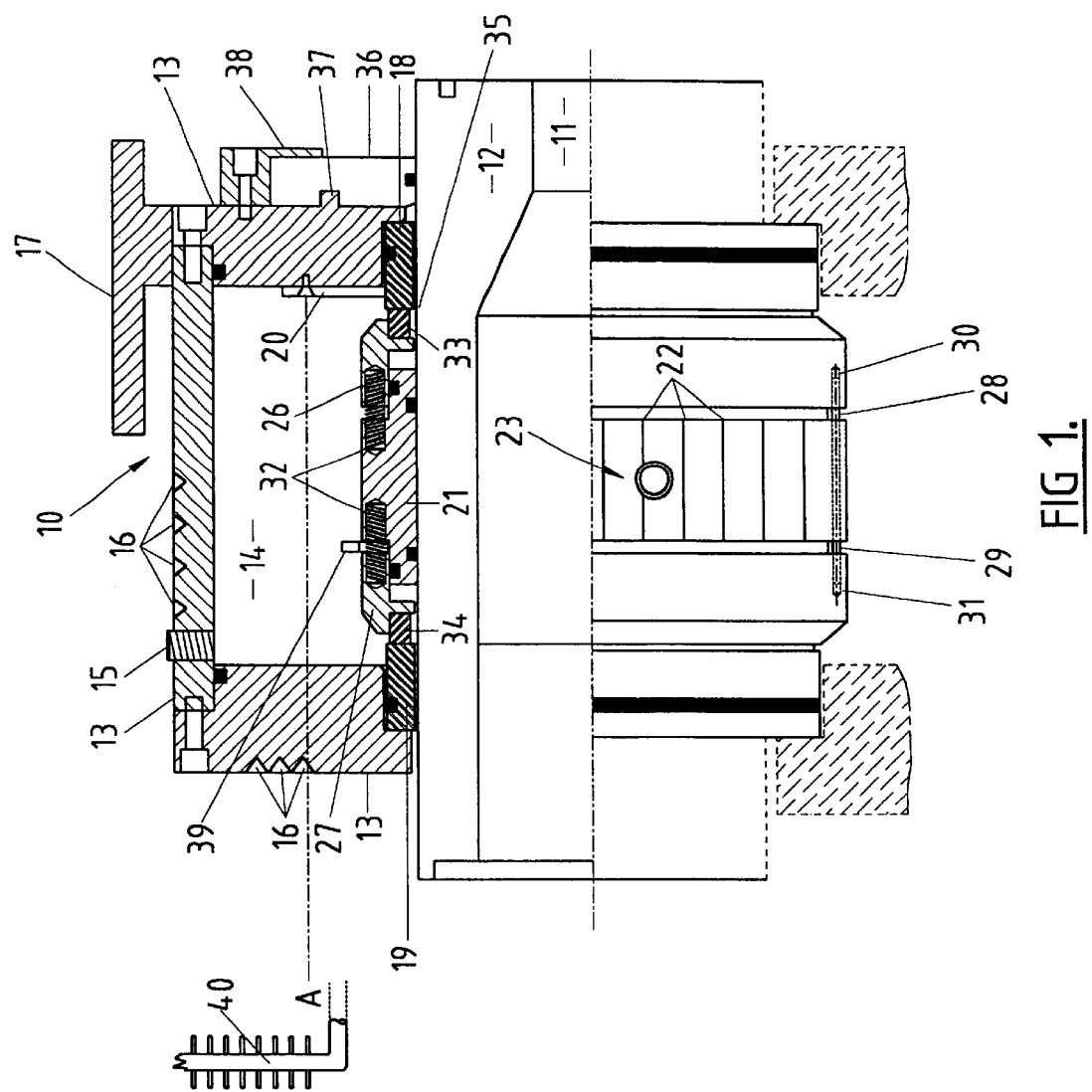
FIG. 1 is a fragmentary partial sectional elevation of a pump seal according to one embodiment of the invention.

As shown in FIG. 1, the seal 10 of the preferred embodiment is in the form of an assembly designed to replace the stuffing box and the pump sleeves of a conventional slurry pump seal. In use, the seal 10 is mounted to a shaft 11 used to drive the impeller (not shown) of a pump. (The impeller is typically fixed to a sleeve 12 on the shaft 11, on the right hand end of the sleeve 12 as depicted in FIG. 1).

The sleeve 12 is itself rotationally fixed to the shaft 11 by axial compression of the mating shoulders of the shaft 11 and the sleeve 12. In this manner, the shaft and sleeve rotate as a single unit, with the impeller mounted on the inner end thereof. The seal locates between the sleeve 12 and the pump housing (not shown).

The seal assembly 10 comprises a casing 13 which defines an annular chamber 14 around the sleeve 12. The casing 13 has at least one opening 15 to provide access to the chamber 14 which, in use, is filled with lubricant to the level "A" shown in the drawing. The outer cylindrical surface of the casing 13 may be provided with cooling grooves 16 which increase surface area to provide better heat dissipation.

The casing 13 also has a radial flange 17 which, in use, abuts against the housing of the slurry pump to which it is mounted. The components to the right of the flange 17 are therefore located within the slurry pump, while the components to the left of the flange 17 are located outside the pump.

A pair of stationary annular sealing members 18, 19 are sealingly mounted to the casing 13, and the shaft/sleeve combination rotates within these stationary sealing members. The inner member 18 is suitably retained in place against the pressure within the slurry pump by a retaining ring 20 screwed to the inside of the casing.

A sealing assembly is provided within the chamber 14. The sealing assembly includes an annular spacer 21 which is in the form of a collar located on the sleeve 12 as shown in FIG. 1. Small grooves 22 may be machined into the outer cylindrical surface of the spacer 21 to promote distribution of the lubricant within the chamber and thereby provide cooling to the sealing faces, metallic and elastomeric components.

Figure 2:
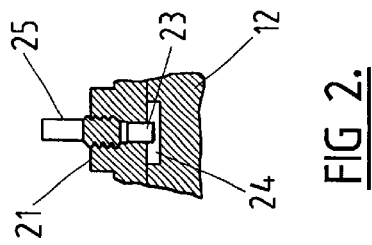
FIG. 2 is a fragmentary elevation view of an oil paddle and key lock suitable for use with the seal of FIG. 1.

A key lock, shown in more detail in FIG. 2, is provided between the spacer 21 and the sleeve 12. The key lock comprises a radial pin member 23 which is screwed into a threaded bore in the spacer 21, and protrudes inwardly of the spacer 21 into an axial keyway 24 formed in the sleeve 12. The key lock arrangement locks the spacer 21 rotationally to the sleeve 12, but permits limited relative axial movement between the spacer 21 and the sleeve 12. That is, as the sleeve 12 rotates, an axial edge of the keyway 24 abuts against the protruding inner end of the pin member 23, causing the spacer 21 to rotate with the sleeve 12. However, the clearance on either side of the pin member 23 in the keyway 24 allows the sleeve to move axially to a limited extent relative to the spacer 21, regardless of whether the sleeve is stationary or rotating.

The outer portion of the pin member 23 serves as a paddle 25 for inducing circulation and misting of the lubricant within the chamber 14, thereby promoting uniform cooling of the seal components.

The sealing assembly also comprises a pair of annular rotating heads 26, 27. The rotating heads are rotationally "locked" to the spacer 21 by pins 28. Each pin 28 passes through a respective axial bore 29 in the spacer 21, and the opposite ends of each pin 28 locate in bores 30, 31 in the respective rotating heads 26, 27. The length of each pin is selected such that there is clearance between the ends of the pin and the blind ends of the bores 30, 31. The rotating heads 26, 27 are constrained to rotate with spacer 21, but the spacer 21 may move axially relative to the rotating heads 26, 27. Typically, two or three pins 28 are provided, equally spaced, around peripheral portion the spacer 21.

The rotating heads 26, 27 are biased axially away from the spacer 21. In the illustrated embodiment, the biasing is achieved by axially orientated coil springs 32 located between the spacer 21 and the rotating heads 26, 27. Each coil spring 32 has its ends located in axially-aligned bores in the spacer 21 and a respective one of the rotating heads 26, 27, as shown in FIG. 1. Typically between 12 and 16 springs are provided circumferentially around the spacer 21.

A spacer 39 is provided between the rotary head 27 and the spacer collar 21. The spacer 39 prevents underloading of the rotating head 26.

Each rotating head 26, 27 has a respective annular rotating face member 33, 34 fixed thereto, e.g. in a heat shrink process. The face member 33 has an annular radial face which is biased against an opposed annular radial face of the stationary sealing member 18 to form a first (inner) dynamic seal 35. The face member 34 has an annular radial face which is biased against an opposed annular radial face of the stationary sealing member 19 to form a second (outer) dynamic seal. The dynamic seals seal between the rotating and stationary portions of the seal 10.

The inner dynamic seal 35 would normally be subject to the pressure of the slurry within the pump. However, a pressure reducing plate 36 is fixed to the sleeve 12. The inner end face of the casing 13 has a circular axial flange 37 thereon, which locates within a corresponding circular groove in the pressure reducing plate 36. The sharp directional changes in the boundary between the casing 13 and the pressure reducing plate 36 provide a pressure differential between the pump chamber and the inner dynamic seal 35, and smooth out any pressure spikes before they reach the seal.

A retainer 38 is fixed to the casing 13. The retainer 38 limits the axial movements of the pressure reducing plate 36 which might occur as the sleeve 12 moves through the seal assembly 10.

The abovedescribed seal has several advantages over known slurry pumps seals, including The seal overcomes problems associated with axial movement of the shaft. This is achieved by allowing relative axial movement between the shaft sleeve 12 and the spacer 21. In the illustrated embodiment, up to 12 mm axial movement in either direction is accommodated without interfering with the critical loading of the dynamic sealing faces. The seal automatically resets itself by the biasing springs 32, thereby equalising the loading on the dynamic sealing faces. The drive mechanism also allows for rotation in either a clockwise or anticlockwise direction.

The fully self-contained seal assembly 10 is easily installed through the replacement of the removeable pump stuffing box and pump sleeves of conventional seals. Hence, the seal assembly 10 can be fitted correctly and simply, without the need for any seal or pump adjustments.

The effect of higher pressures and pressure spikes within the slurry pump is reduced through the pressure reducer 36 incorporated in the seal assembly.

The hydraulic balancing of the dynamic seals allows for higher pressure sealing (e.g. accommodating pumps provided in series).

The seal assembly can run "dry" as it operates its own self-contained lubricated chamber.

The seal overcomes many of the clogging problems associated with conventional seals, by positioning the critical sealing components out of the pumpage and in its own clean, lubricated environment.

The seal assembly 10 eliminates the need for flushing due to its double seal design and its own contained lubricant located in the chamber 14.

The double seal arrangement provides longer life. Even if the primary seal 35 on the rotating face 33 wears out, the secondary seal on the rotating face 34 still provides a sealing function. This facilitates programmed maintenance.

The paddle incorporated in the seal drive mechanism promotes oil circulation and misting in the relatively large radial clearance chamber 14. Coupled with the deflection grooves on the spacer 21 and the cooling grooves 16 on the external surface of casing 13, adequate uniform cooling is provided to the sealing faces, metallic and elastomeric components.

The sealing chamber can be pressurised, if required, to accommodate high product pressures and to eliminate the bypass of fine micron slurry across the inner dynamic seal face.

Figure 3:
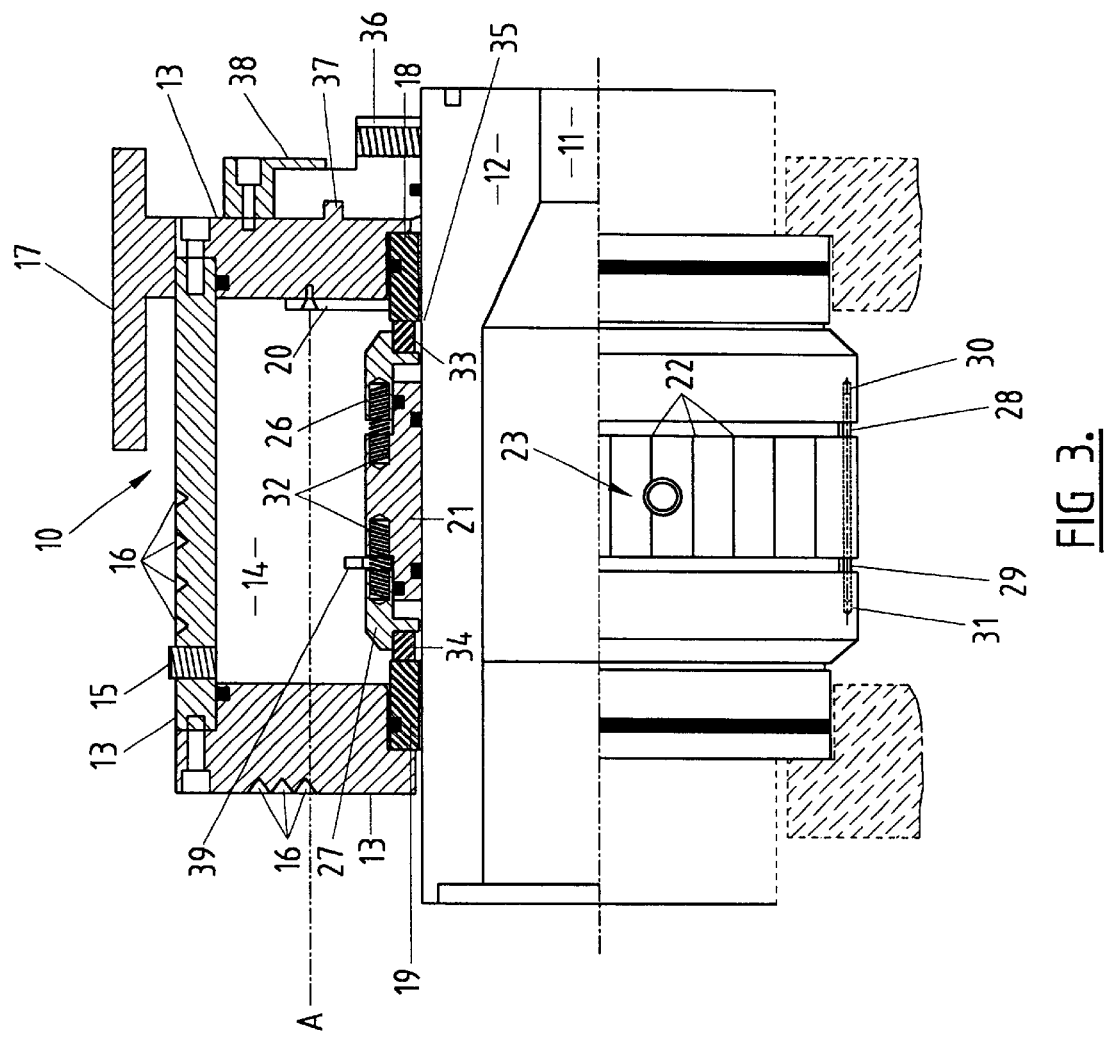
FIG. 3 is a fragmentary partial sectional elevation of a pump seal according to a second embodiment of the invention.

FIG. 3 illustrates a modified version of the seal of FIG. 1, and the same numerals have been used to refer to like elements of the seal. In the modified seal of FIG. 3, the pressure reducing plate 36 is provided with a flanged collar which is grub screwed to the sleeve 12. This ensures that the pressure reducing plate 36 is positively driven by the sleeve 12, particularly in the presence of slurries of higher viscosity.

Figure 4:
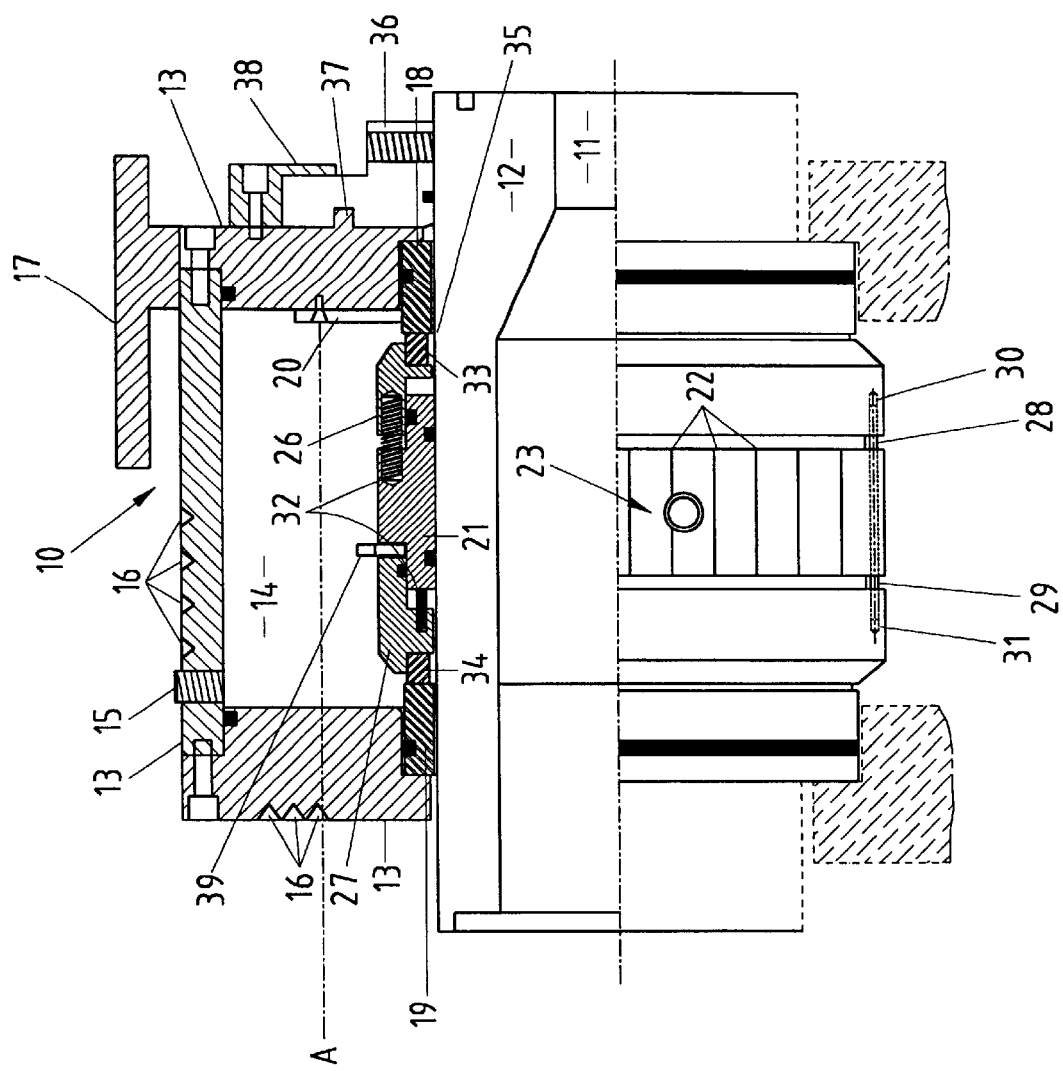
FIG. 4 is a fragmentary partial sectional elevation of a pump seal according to a third embodiment of the invention.

FIG. 4 illustrates a modified version of the seal of FIG. 3, and the same numerals have been used to refer to like elements. In the embodiment of FIG. 4, the outer spring 32 (between the spacer 21 and the outer rotating head 27) is repositioned so that it is no longer within the oil chamber 14, but is now located on the "dry" side of the rotating head 27, i.e. on the atmosphere side of the second (outer) dynamic seal. This prevents clogging of the outer dynamic seal if the slurry finds its way past the inner dynamic seal.

Figure 5:
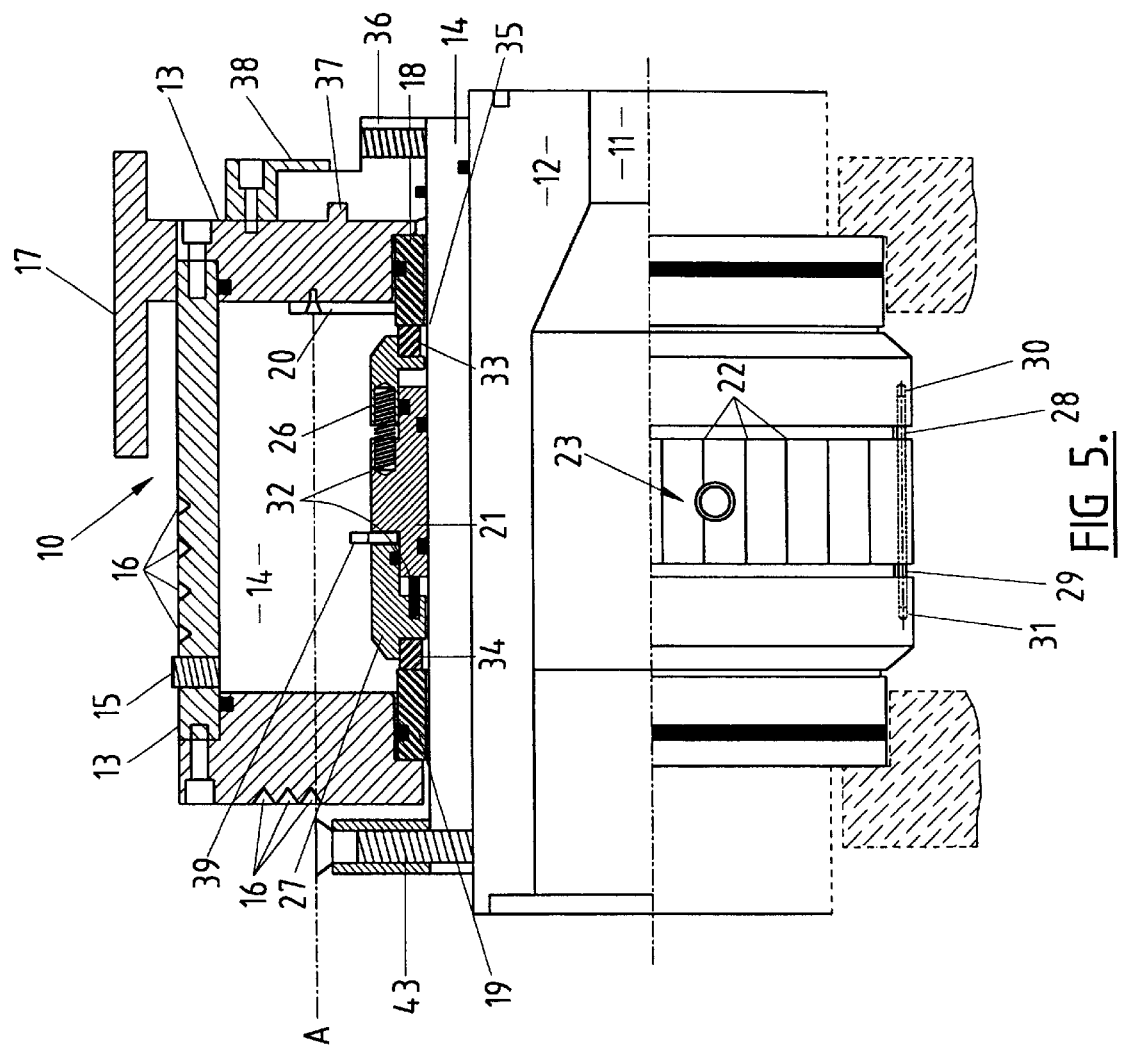
FIG. 5 is a fragmentary partial sectional elevation of a pump seal according to a fourth embodiment of the invention.

FIG. 5 illustrates a modified version of the seal of FIG. 4, and the same numerals have been used to refer to like elements. In the embodiment of FIG. 5, an additional sleeve 41 is located around sleeve 12. The benefit of this arrangement is that the internal sealing assembly can be positively fixed to the outer sleeve 41 by grub screw 43. This overcomes the problem of excessive heat and wear due to overloading of the outer dynamic seal. Axial adjustment of the pump sleeve 12 can be made in order to maintain pump efficiency, without affecting the loading of the seal assembly. The fixing of the internal sealing assembly to the outer sleeve 41 replaces the key lock arrangement 23 of FIG. 2, without loosing the benefits thereof. When the pump sleeve 12 is adjusted, an O-ring 42 located in outer sleeve 41 always moves over a clean surface, resulting in ongoing effective sealing.

Figure 6:
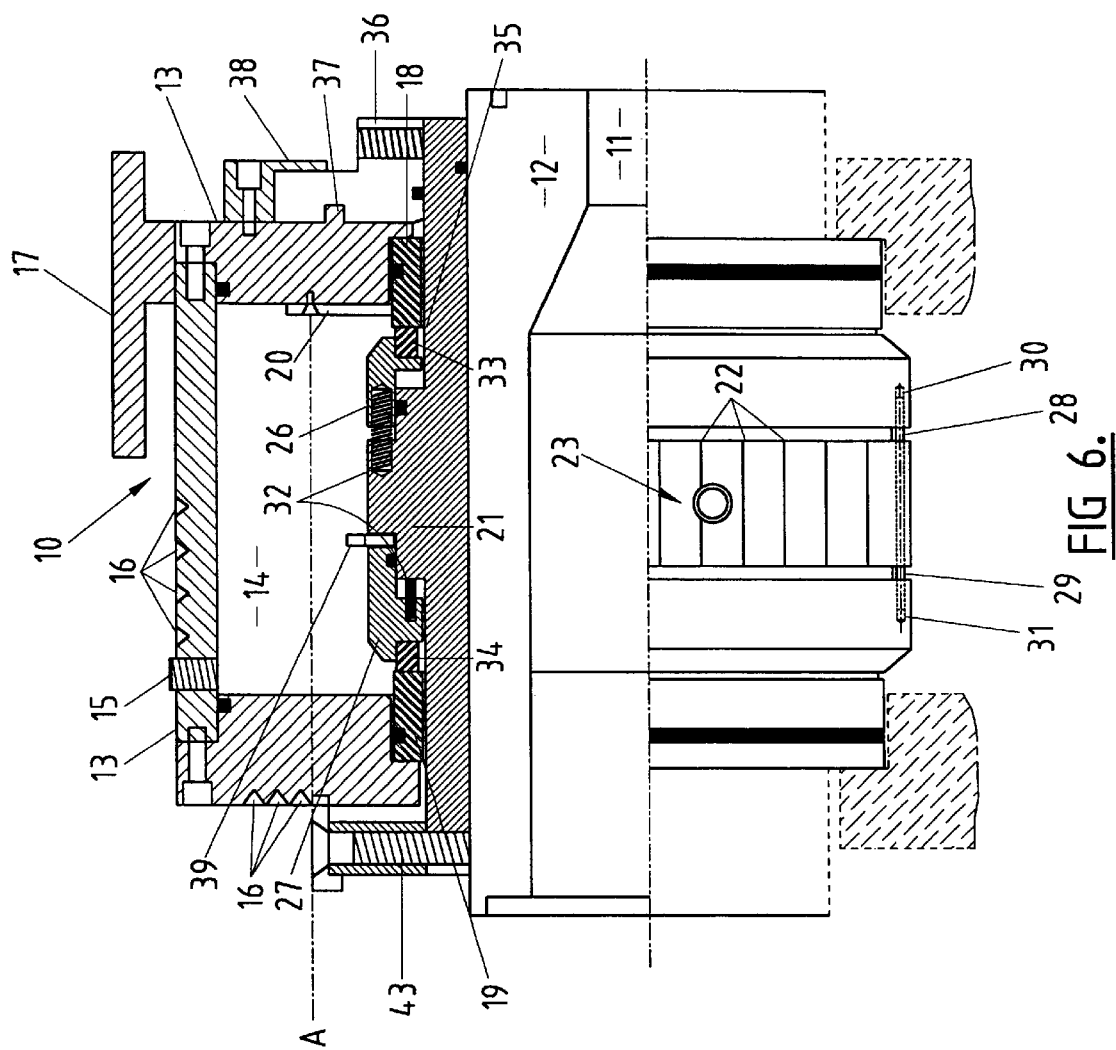
FIG. 6 is a fragmentary partial sectional elevation of a pump seal according to a fifth embodiment of the invention.

FIG. 6 illustrates a modified version of the seal of FIG. 5, and the same numerals have been used to indicate like elements. In the embodiment of FIG. 6, the outer sleeve 41 and the spacer 21 are machined as a single component. Again, as the spacer 21 is grub screwed to the sleeve 12, the spacer rotates with the sleeve 12, without the need for the lock key arrangement of FIG. 2. Yet, the spacer is still moveable axially relative to the sleeve 12.

The foregoing describes only some embodiments of the invention, and modifications which are obvious to those skilled in the art may be made thereto without departing from the scope of the invention as defined in the following claims.

For example, the chamber 14 in the seals of the above-described embodiments may be connected to an external cooling system 40 for the lubricant, if required.

Further, although the seal of this invention has been described with particular reference to slurry pumps, it can be used in other applications.

The claims defining the invention are as follows:

1. A seal including a housing having two axially-spaced stationary sealing surfaces, a shaft assembly rotatable in the housing, a sealing assembly mounted on the shaft assembly and rotatable therewith, the sealing assembly having two moveable sealing surfaces, each operatively biased against a respective one of the stationary sealing surfaces to seal therebetween, and a spacer member located between the two moveable sealing surfaces, the two moveable sealing surfaces being located on respective heads which rotate with the spacer member but are biased axially away from the spacer member towards their respective stationary sealing surfaces, the spacer member being locked rotationally to the shaft assembly by a keylock arrangement which permits relative axial movement between the spacer and the shaft assembly, wherein the shaft assembly is moveable axially relative to the sealing assembly, so that the seal between the stationary sealing surface and the moveable sealing surface is maintained even when the shaft is moved axially.

2. A seal as claimed in claim 1, wherein the keylock arrangement comprises a keyway in the outer surface of the shaft assembly, and a key member fixed to the spacer member and protruding into the keyway, the keyway being dimensionally greater in the axial direction than the key member.

3. A seal as claimed in claim 1, wherein the housing has a chamber in which the sealing assembly is located, the housing operatively containing a liquid lubricant.

4. A seal as claimed in claim 3, further comprising a paddle member extending radially outwardly from the spacer member.

5. A seal as claimed in claim 1, further comprising springs between the spacer member and the heads to bias the heads away from the spacer member.

6. A seal as claimed in claim 5, wherein the springs between the spacer member and the outer of the heads are located outside the lubricant-containing chamber.

7. A seal as claimed in claim 5, further comprising a spacer block between the spacer member and at least one of the heads.

8. A seal including a housing having at least one stationary sealing surface, a shaft assembly rotatable in the housing, the shaft assembly comprising a shaft having a sleeve fixed rotationally to the shaft, a sealing assembly mounted on the shaft assembly and rotatable therewith, the sealing assembly having at least one moveable sealing surface operatively abutting the stationary sealing surface to seal therebetween, wherein the shaft assembly is moveable axially relative to the sealing assembly, so that the seal between the stationary sealing surface and the moveable sealing surface is maintained even when the shaft is moved axially.

9. A seal as claimed in claim 8, further comprising a seal sleeve located around the sleeve, the spacer member being fixed to the seal sleeve.

10. A seal as claimed in claim 9, wherein the spacer member is formed integrally with the seal sleeve.

11. A seal including
a housing having at least one stationary sealing surface,
a shaft assembly rotatable in the housing,
a pressure reducing plate member extending between the housing and the shaft assembly,
a sealing assembly mounted on the shaft assembly and rotatable therewith, the sealing assembly having at least one moveable sealing surface operatively abutting the stationary sealing surface to seal therebetween,
wherein the shaft assembly is moveable axially relative to the sealing assembly, so that the seal between the stationary sealing surface and the moveable sealing surface is maintained even when the shaft is moved axially.

12. A seal as claimed in claim 11, wherein the pressure reducing plate member is fixed to the shaft assembly.

13. A seal assembly for sealing between a shaft assembly and a housing, the seal assembly comprising a housing having at least one stationary sealing surface,
a shaft assembly rotationally mounted in the housing, the shaft assembly having an axial keyway in its outer cylindrical surface,
a spacer member mounted to the shaft assembly in use and having a key member protruding radially into the keyway, whereby the spacer member is constrained to rotate with the shaft assembly, but is moveable axially relative to the shaft assembly at least to a limited extent, and
at least one rotating head having a moveable sealing surface, the rotating head being biased relative to the spacer member so that its sealing surface abuts the stationary sealing surface, the sealing abutment of the moveable sealing surface against the stationary sealing surface being maintained despite axial movement of the shaft assembly relative to the spacer member.

* * * * *